US011268825B2

(12) United States Patent
White, III

(10) Patent No.: US 11,268,825 B2
(45) Date of Patent: Mar. 8, 2022

(54) SAFETY AND PERFORMANCE INTEGRATION DEVICE FOR NON-AUTONOMOUS VEHICLES

(71) Applicant: Autoligence Inc., St. Augustine, FL (US)

(72) Inventor: William Collins White, III, Palm Coast, FL (US)

(73) Assignee: Autoligence Inc., St. Augustine, FL (US)

( * ) Notice: Subject to any disclaimer, the term of this patent is extended or adjusted under 35 U.S.C. 154(b) by 0 days.

(21) Appl. No.: 16/670,792

(22) Filed: Oct. 31, 2019

(65) Prior Publication Data
US 2021/0025730 A1 Jan. 28, 2021

Related U.S. Application Data

(60) Provisional application No. 62/879,101, filed on Jul. 26, 2019.

(51) Int. Cl.
G01C 21/36 (2006.01)
G01C 21/34 (2006.01)
G07C 5/08 (2006.01)
G07C 5/00 (2006.01)

(52) U.S. Cl.
CPC ..... *G01C 21/3691* (2013.01); *G01C 21/3492* (2013.01); *G07C 5/008* (2013.01); *G07C 5/0808* (2013.01)

(58) Field of Classification Search
None
See application file for complete search history.

(56) References Cited

U.S. PATENT DOCUMENTS

| 10,386,195 | B1* | 8/2019 | Grunberger | G01C 21/3682 |
| 10,769,954 | B1* | 9/2020 | Fields | G06Q 40/08 |
| 2014/0009275 | A1* | 1/2014 | Bowers | G06Q 40/08 |
| | | | | 340/436 |
| 2014/0136045 | A1* | 5/2014 | Zhu | B60W 30/08 |
| | | | | 701/23 |
| 2014/0309849 | A1* | 10/2014 | Ricci | G01C 21/26 |
| | | | | 701/33.4 |
| 2016/0049079 | A1* | 2/2016 | Ibrahim | G01S 19/49 |
| | | | | 340/944 |
| 2016/0055750 | A1* | 2/2016 | Linder | G08G 1/0141 |
| | | | | 340/905 |
| 2016/0357187 | A1* | 12/2016 | Ansari | G01S 13/862 |
| 2017/0276492 | A1* | 9/2017 | Ramasamy | G08G 1/096758 |
| 2018/0054851 | A1* | 2/2018 | Condeixa | H04W 88/04 |
| 2018/0165531 | A1* | 6/2018 | Sathyanarayana | ............................ |
| | | | | G06K 9/00805 |
| 2019/0035267 | A1* | 1/2019 | Balzer | G08G 1/07 |
| 2019/0287407 | A1* | 9/2019 | Branscombe | G08G 1/164 |

(Continued)

*Primary Examiner* — James J Lee
*Assistant Examiner* — Tawri M Matsushige
(74) *Attorney, Agent, or Firm* — BakerHostetler

(57) ABSTRACT

A method, apparatus, and system for integrating a non-autonomous vehicle into a transit environment populated with autonomous vehicles. An autonomous vehicle network integration apparatus is disclosed which collects data over a wireless network regarding a vehicle's route and surroundings, including nearby fully and partially autonomous vehicles. The apparatus is configured to analyze data and dynamically determine a range of influence, within which it communicates with vehicles to suggest driver actions and inform self-driving vehicle behavior.

21 Claims, 14 Drawing Sheets

(56) References Cited

U.S. PATENT DOCUMENTS

2019/0325747 A1* 10/2019 Fleming ............. G01C 21/3484
2020/0142422 A1* 5/2020 Valois ................ G06K 9/00805

* cited by examiner

SAFETY AND PERFORMANCE INTEGRATION DEVICE FOR NON-AUTONOMOUS VEHICLES

CROSS REFERENCE TO RELATED APPLICATION

This application claims the benefit of priority under 35 USC 119(e) of U.S. provisional application No. 62/879,101, filed on Jul. 26, 2019.

BACKGROUND

As autonomous vehicles (e.g. self-driving or "smart vehicles") populate the road in increasing numbers, their benefits with regard to safety, emissions, and traffic reduction will become increasingly clear. Fully autonomous vehicles are designed with a sophisticated and redundant suite of sensors, such as RADAR, LIDAR, ultrasound, and cameras that monitor the autonomous vehicle's nearby and distant surroundings continually. They typically include a wireless transceiver by which they may communicate with a global positioning system (GPS), centralized fleet control, and each other.

In spite of the advantages autonomous vehicles will provide, it is likely that widespread adoption will be slow. The established presence of "dumb" or non-autonomous vehicles on the roads, and their track-record of over a century, may lead many consumers to resist adopting such a new and comparatively untested technology. In addition, the sophistication and complexity of the systems needed to implement autonomous vehicle technology incurs high costs. Self-driving cars may be economically out of reach for most drivers for years to come.

An aftermarket solution is needed to integrate non-autonomous vehicles into the network of autonomous vehicles. Such a solution may improve consumer receptivity to increasing automation levels, and may improve autonomous vehicle performance by providing a mechanism by which autonomous vehicles may influence and be influenced by more of the vehicles they encounter on the roads.

BRIEF SUMMARY

This disclosure relates to autonomous vehicle network integration (AVNI), a method for integrating a non-autonomous vehicle into an autonomous vehicle network. This method comprises activating an autonomous vehicle network integration application on a mobile device detected within a primary vehicle. A destination and a route to the destination are detected from the mobile device. Environmental conditions along the route are detected using on vehicle sensors on the primary vehicle and data accessed through the mobile device. Traffic conditions are detected along the route based on data accessed through the mobile device. A base influence range is calculated using the environmental conditions and the traffic conditions. On-board diagnostic data (OBD data) is monitored during operation of the primary vehicle. OBD data monitored includes location, velocity, and direction. An influence vector is calculated based on the location, the velocity, and the direction. A moving influence range is dynamically updated based on the base influence range and the influence vector. At least one secondary vehicle is detected within at least one of the base influence range and the moving influence range. The influence vector is transmitted to the secondary vehicle, and a secondary influence vector is received from the secondary vehicle. The moving influence range is dynamically updated based on the secondary influence vector. Continuous guidance is provided to a driver through the mobile device, wherein the continuous guidance comprises route navigation guidance and hazard avoidance guidance.

This disclosure further relates to autonomous vehicle network integration apparatus comprising an on-board diagnostics connection port, a wireless transceiver, a processor, and a memory storing instructions that, when executed by the processor, implement the method disclosed herein. Finally, this disclosure relates to an autonomous vehicle network integration system comprising a primary vehicle, wherein the primary vehicle is not an autonomous vehicle and the primary vehicle includes an on-board diagnostics system; a mobile device, wherein the mobile device is configured with an autonomous vehicle network integration application; and the autonomous vehicle network integration apparatus disclosed herein.

While the autonomous vehicle network integration apparatus and autonomous vehicle network integration system disclosed comprise technology primarily expected in road transport vehicles, the method of the present disclosure may be expanded to include rail, marine, and air transportation. "Dumb trains," "dumb boats," and "dumb planes" may be configured with an analogous solution in order to integrate with networks of autonomous rail engines, watercraft, and aircraft, respectively.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The method, apparatus, and system disclosed herein provide an aftermarket solution for allowing a non-autonomous vehicle to seamlessly communicate with and interact with autonomous vehicles in their vicinity and, in some embodiments, an autonomous vehicle network integration data management center. By means of a wireless transceiver incorporated into an autonomous vehicle network integration apparatus, information may be collected from the data management center and a mobile device within the vehicle, as well as autonomous or semi-autonomous vehicles around them.

In addition to collecting information from surrounding vehicles and other sources, the autonomous vehicle network integration apparatus disclosed herein may transmit similar data to surrounding vehicles, allowing similarly equipped vehicles to better anticipate and adjust for the non-autonomous vehicle disclosed. Data collected may also be used to continually generate guidance for the driver. This continuous guidance may take the form of route navigation guidance and/or hazard avoidance guidance. This guidance may be provided to the driver by means of audible or visual alerts and notifications on the driver's mobile device.

Figure 1:
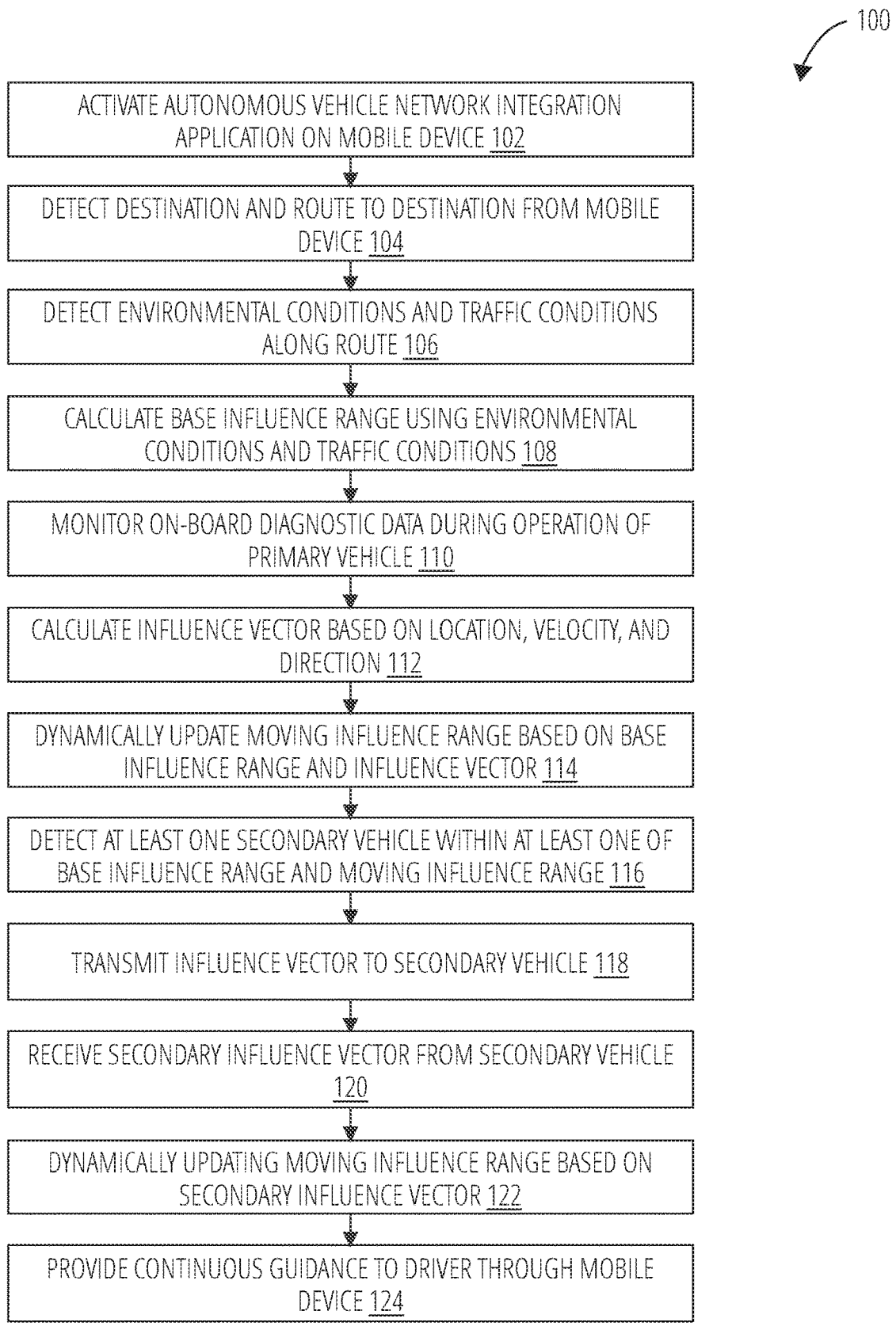
FIG. 1 illustrates a routine for integrating a non-autonomous vehicle into an autonomous vehicle network, in accordance with one embodiment.
Figure 2:
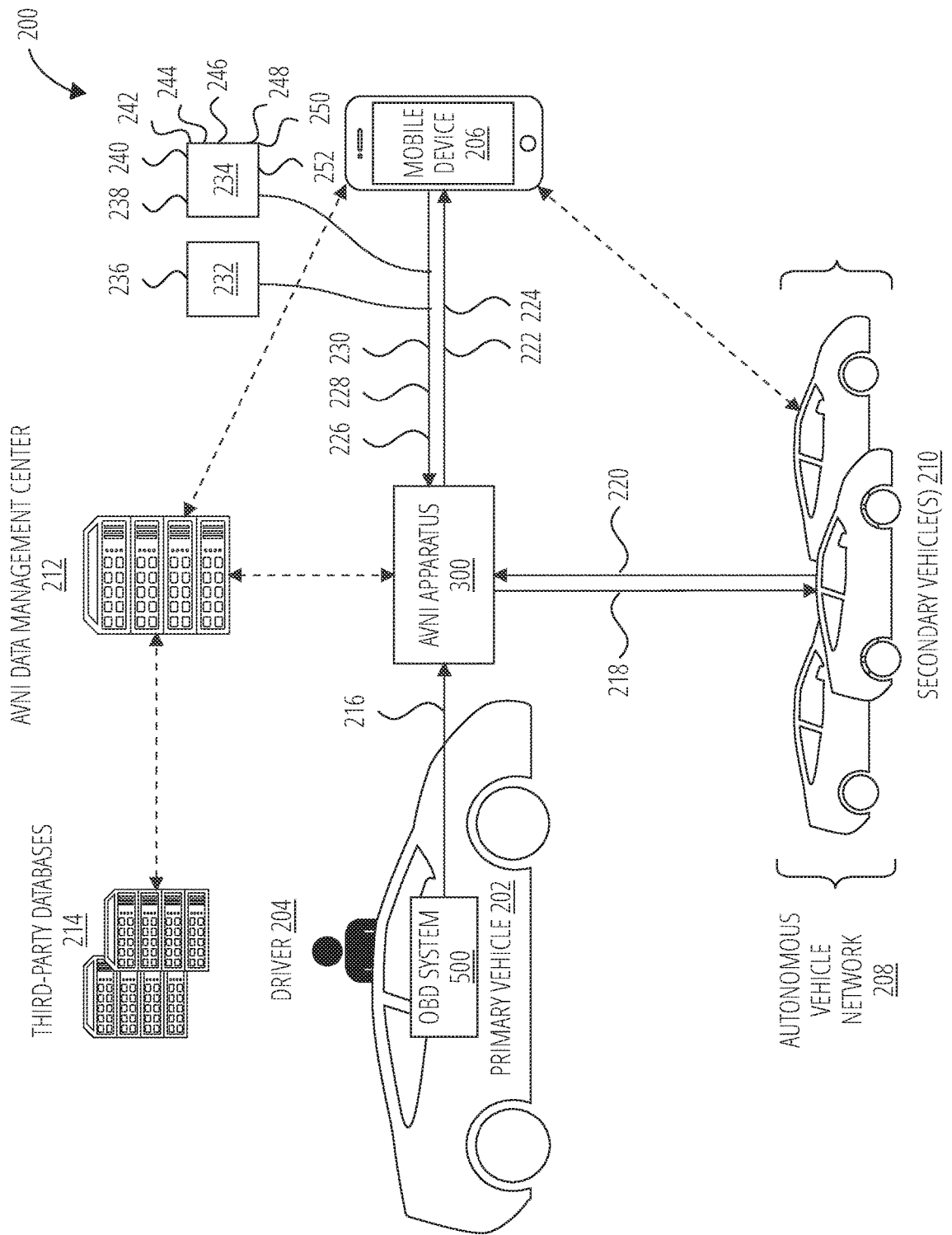
FIG. 2 illustrates an autonomous vehicle network integration system 200 in accordance with one embodiment.
Figure 3:
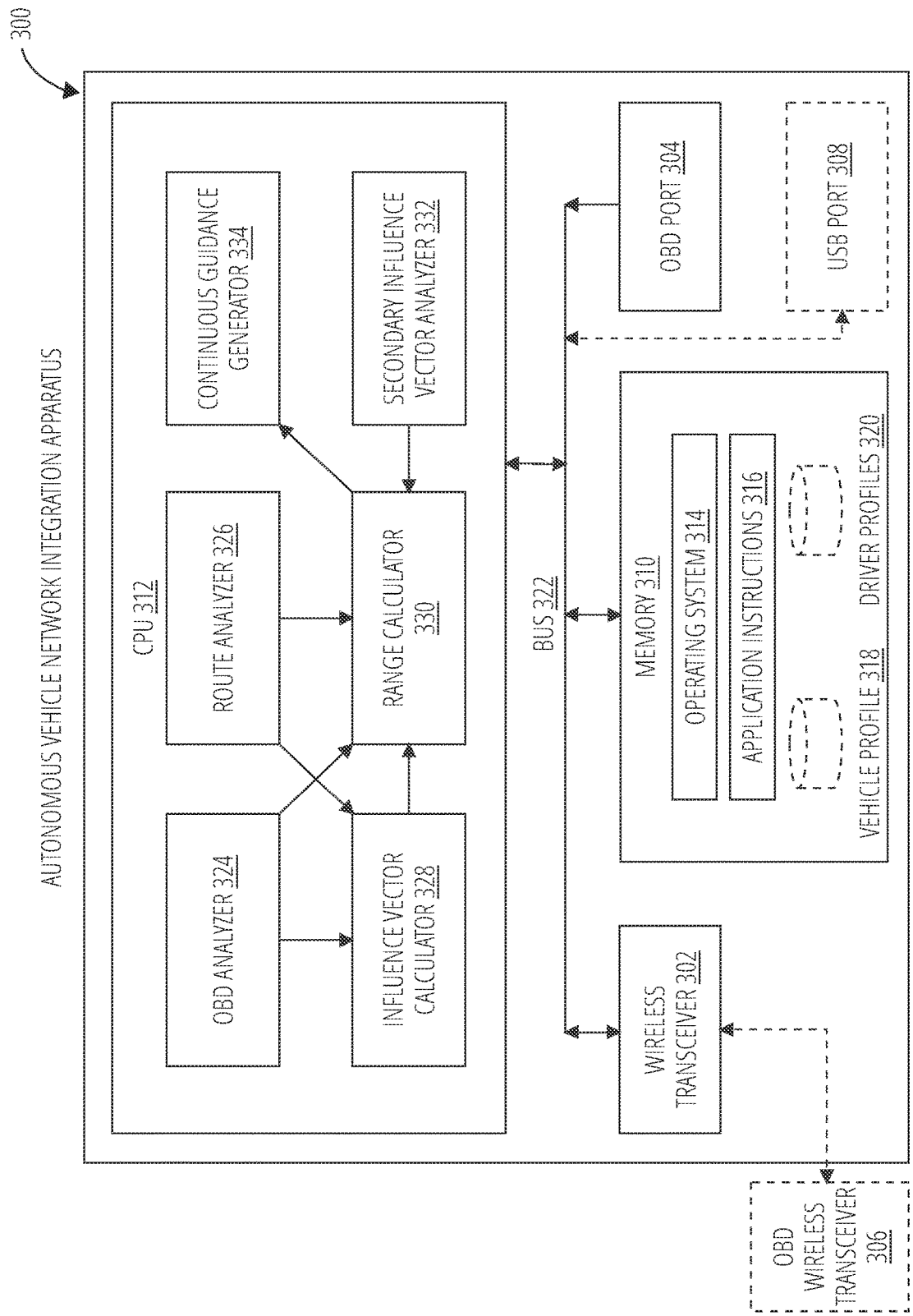
FIG. 3 illustrates an autonomous vehicle network integration apparatus 300 in accordance with one embodiment.

FIG. 1 illustrates a routine 100 for integrating a non-autonomous vehicle into an autonomous vehicle network, in accordance with one embodiment. This routine 100 may be performed by an autonomous vehicle network integration system 200 which includes an autonomous vehicle network integration apparatus 300, as illustrated in FIG. 2 and FIG. 3.

The routine 100 begins with a block 102, in which an autonomous vehicle network integration application is activated on a mobile device. This mobile device may be a cell phone, a tablet computer, a GPS navigational display configured to implement the tasks disclosed herein, or some other portable means of collecting data over a wireless network and displaying information to a driver. An embodiment of a user interface for this autonomous vehicle network integration application is described in more detail with regard to FIG. 4.

The routine 100 continues with a block 104, in which a destination and a route to the destination are detected from the mobile device. In block 106, environmental conditions and traffic conditions are then detected along the route. The environmental conditions and traffic conditions are used in block 108 to calculate a base influence range. For example, if heavy rains are detected along the route, the base influence range may be expanded to compensate for a potential reduction in visibility and braking performance. If heavy traffic is anticipated, the base influence range may be reduced in order to limit the number of wireless communications the primary vehicle may perform and the associated power consumption.

During primary vehicle operation, at block 110, on-board diagnostic data (OBD data) is monitored. This OBD data may be used to determine the primary vehicle's velocity, while route information gathered from the mobile device may be used to determine the primary vehicle's location and direction. At block 112, the routine 100 uses the location, velocity, and direction to calculate an influence vector. An illustration of the systems providing OBD data, as well as the data provided that may be used to implement the disclosed solution, is provided in FIG. 5.

Figure 6:
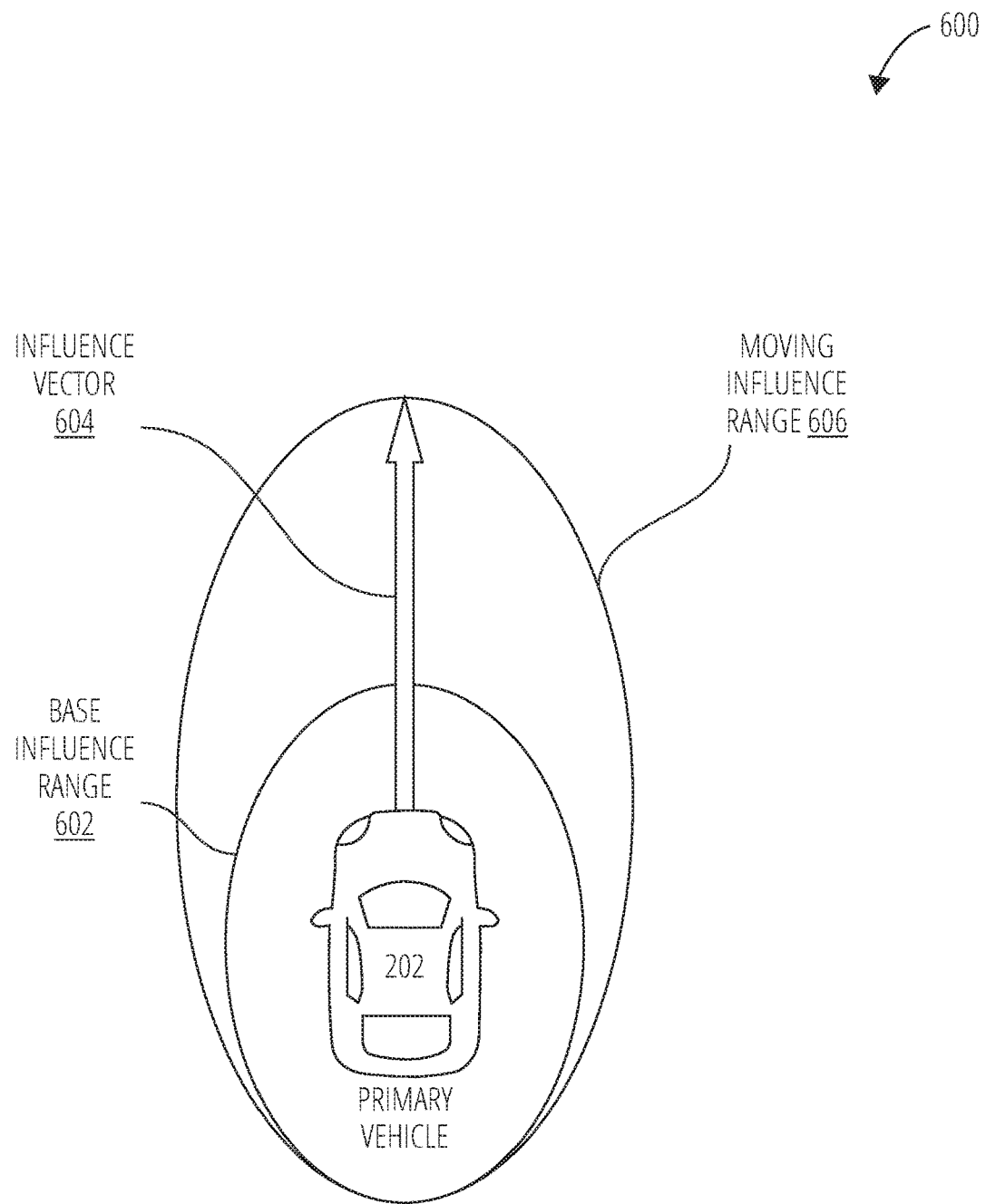
FIG. 6 illustrates an influence vector and ranges 600 in accordance with one embodiment.
Figure 7:
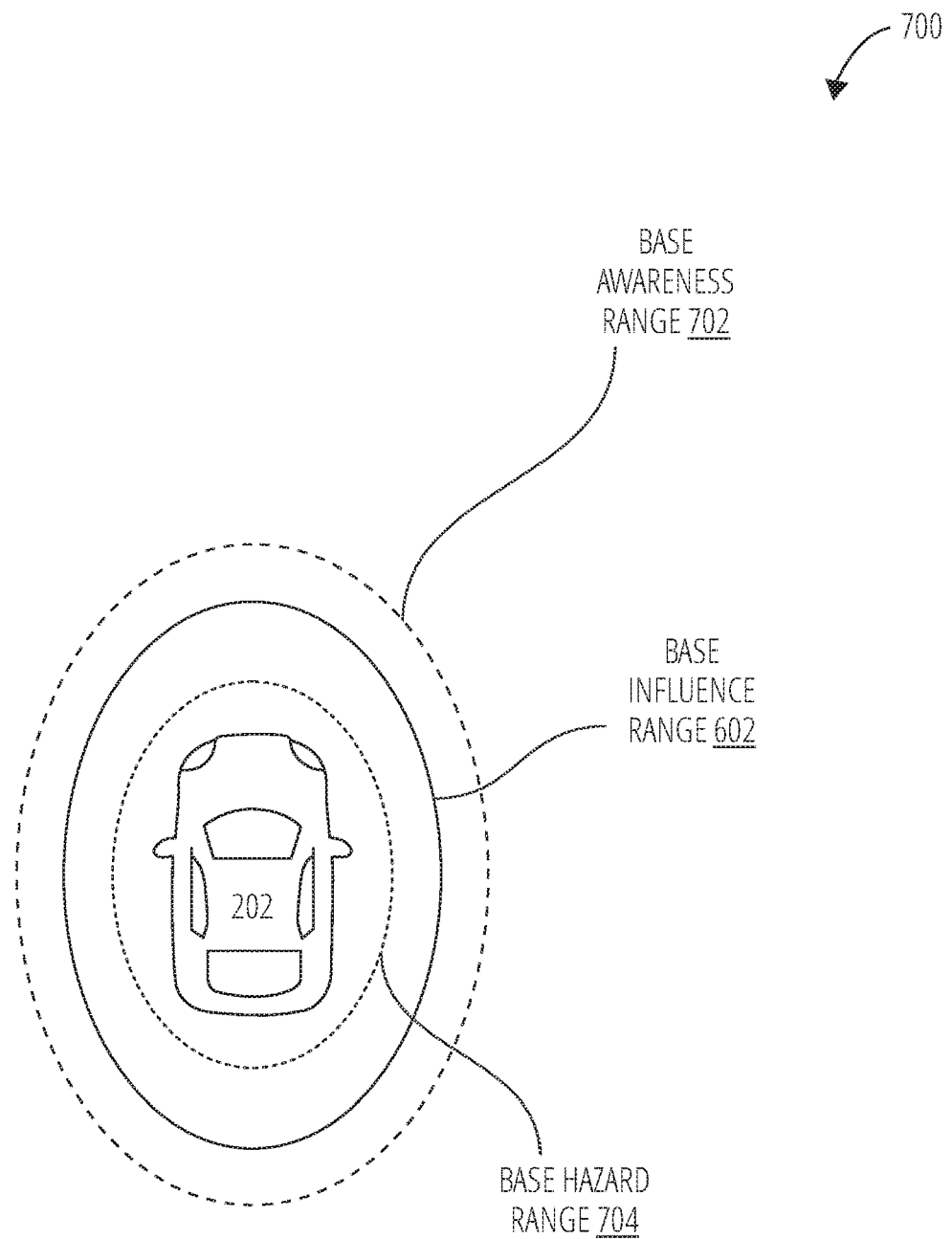
FIG. 7 illustrates a base range levels 700 in accordance with one embodiment.
Figure 8:
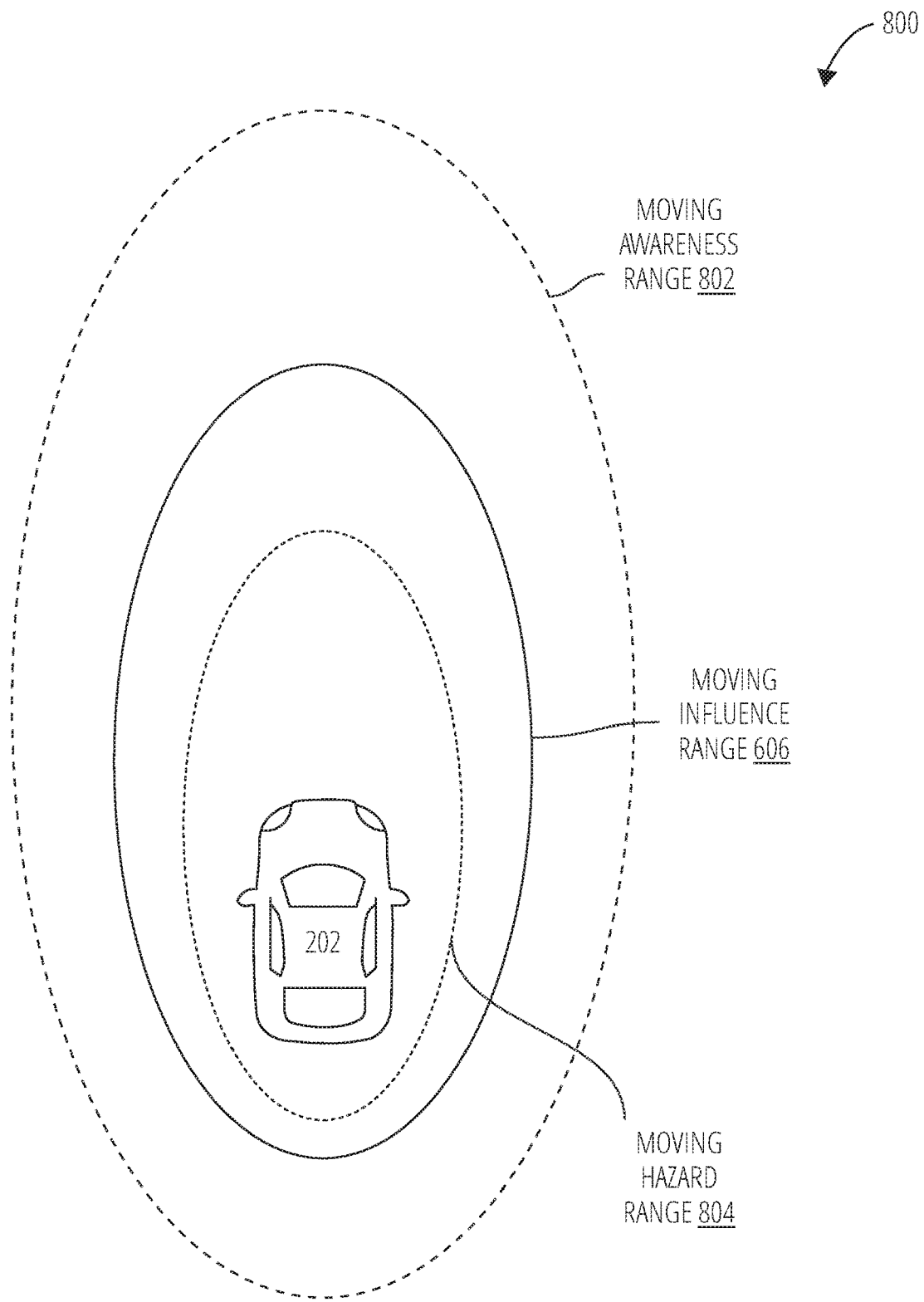
FIG. 8 illustrates a moving range levels 800 in accordance with one embodiment.
Figure 9:
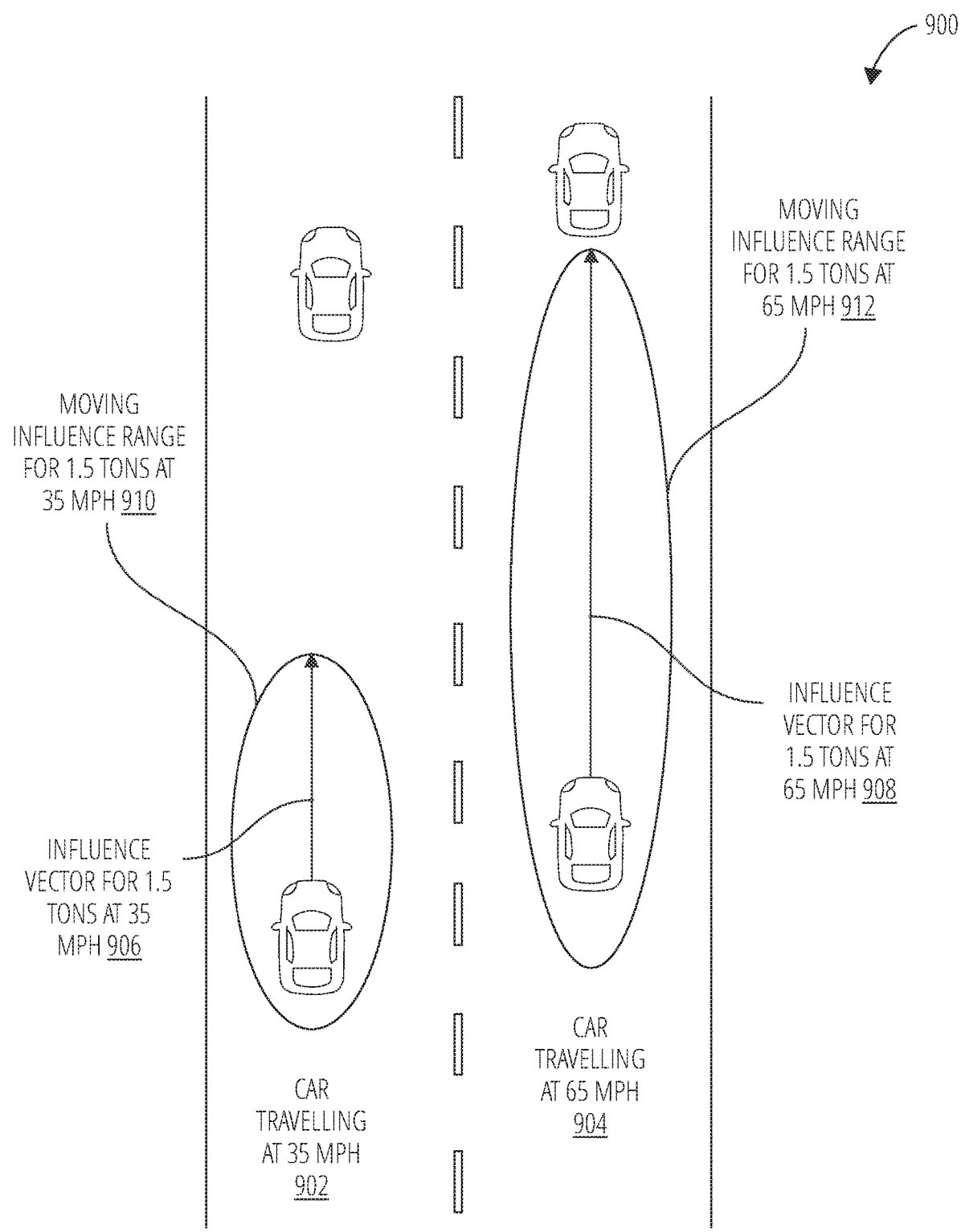
FIG. 9 illustrates an influence vector and range comparison by velocity 900 in accordance with one embodiment.
Figure 10:
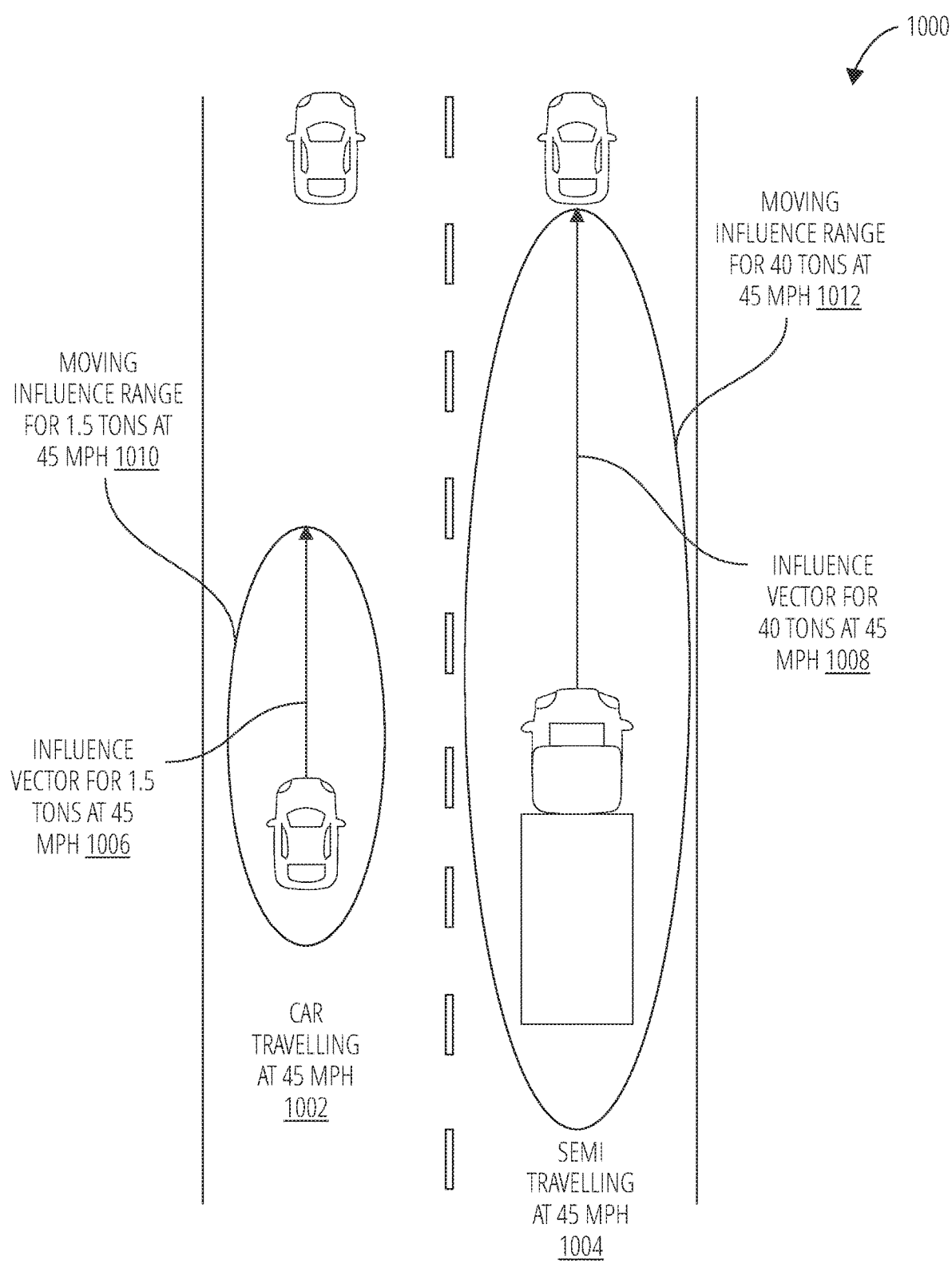
FIG. 10 illustrates an influence vector and range comparison by mass 1000 in accordance with one embodiment.

Routine 100 continues with block 114, in which a moving influence range is dynamically updated based on the base influence range and the influence vector. The relationship between base influence range, influence vector, and moving influence range in accordance with one embodiment is illustrated in FIG. 6. In some embodiments, a base awareness range and a moving awareness range may be established which extend beyond the corresponding influence ranges. These awareness ranges may be used to provide additional reaction time by earlier transmission and reception of influence vectors in specific circumstances. A base hazard range and a moving hazard range may be established within the corresponding influence ranges in some embodiments to provide a mechanism to trigger critical alerts when conditions change or hazards are detected in close proximity to the primary vehicle. These additional ranges are illustrated in FIG. 7 and FIG. 8. Factors which may in some embodiments affect the influence vector and thus the moving influence range are illustrated in FIG. 9, and FIG. 10.

As the primary vehicle is operated, a secondary vehicle may be detected within the base influence range or moving influence range, in accordance with block 116. When this occurs, the influence vector is transmitted to the secondary vehicle (block 118) and a secondary influence vector is received from the secondary vehicle (block 120). The transmission and reception of influence vectors may be a primary mechanism by which the non-autonomous vehicle may be integrated into the autonomous vehicle network. At block 122, routine 100 dynamically updates the primary vehicle's moving influence range based on the secondary influence vector received from the secondary vehicle. For example, should some aspect of the secondary influence vector indicate that the autonomous secondary vehicle has high priority, the moving influence range for the primary vehicle may be reduced such that the primary vehicle may cede right of way to the secondary vehicle.

Figure 11:
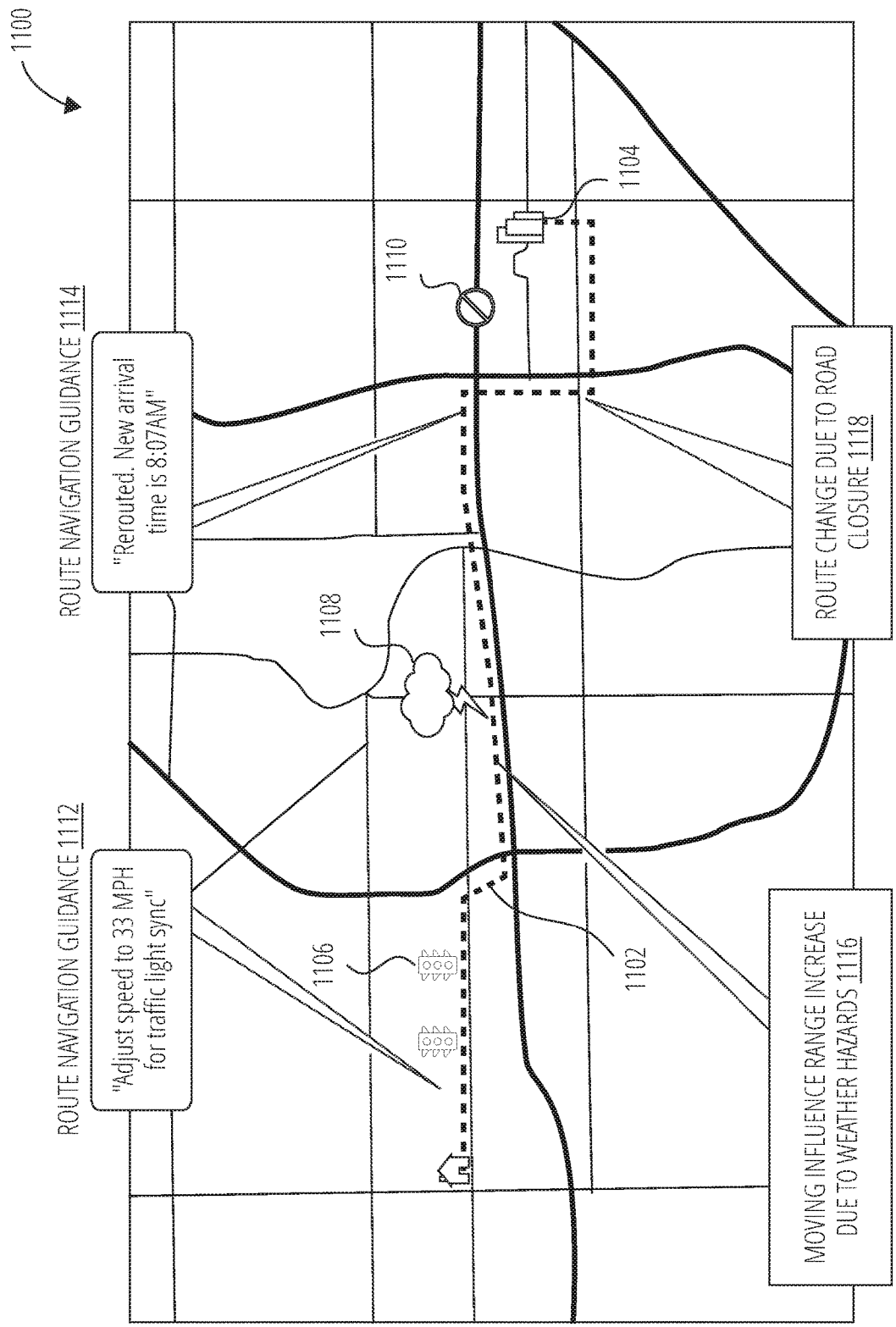
FIG. 11 illustrates routing related decisions 1100 in accordance with one embodiment.
Figure 12:
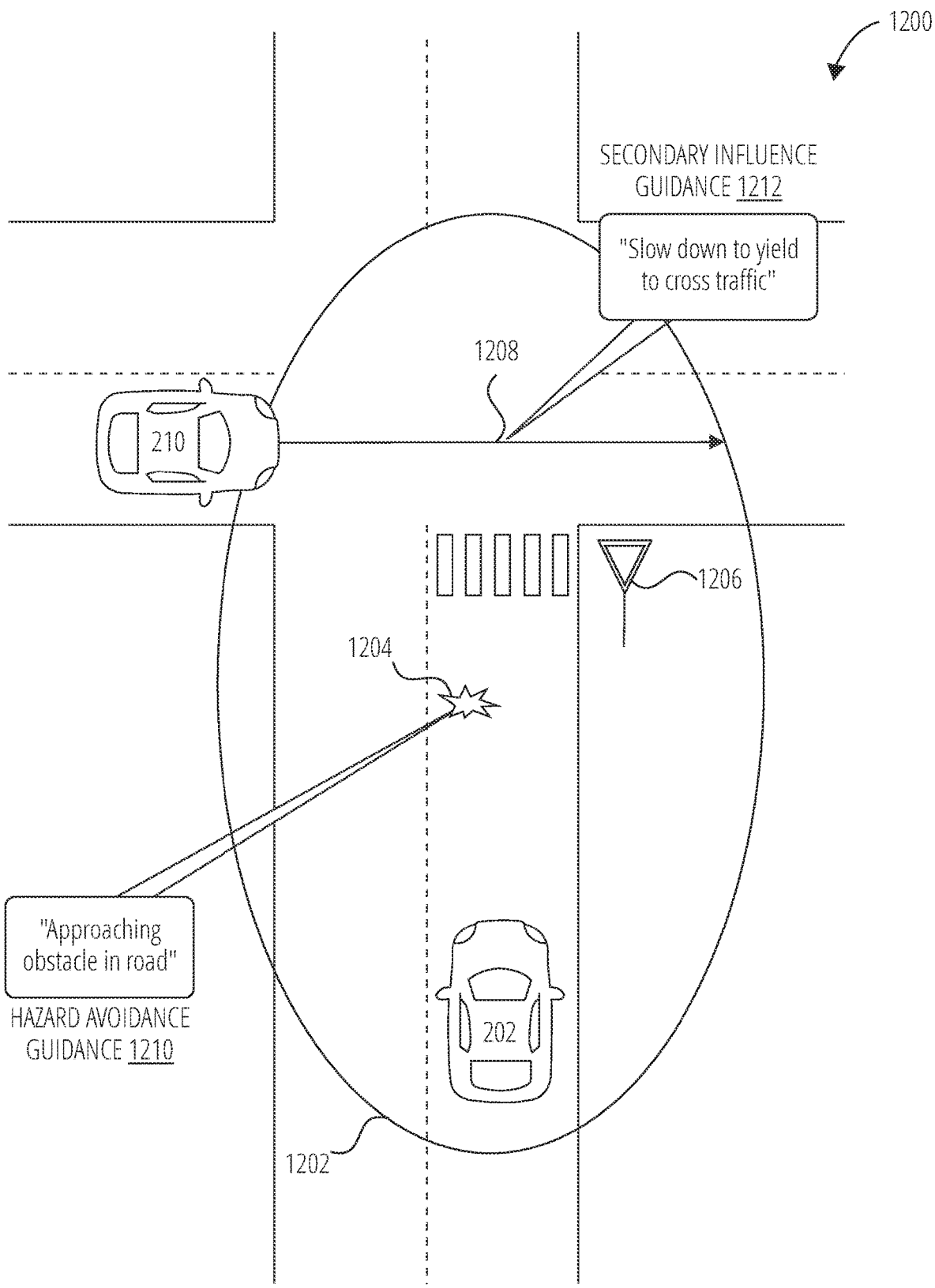
FIG. 12 illustrates a hazard and secondary influence decisions 1200 in accordance with one embodiment.

Finally, in block 124 of routine 100, the mobile device is used to provide continuous guidance to the driver based on the data collected and the vectors and ranges calculated. For example, audible alerts may be generated when a secondary vehicle is detected within the influence range. Weather conditions may be reported. Driving instructions may be given which will reduce travel time. Examples of continuous guidance are illustrated in FIG. 11 and FIG. 12.

FIG. 2 illustrates an autonomous vehicle network integration system 200 in accordance with one embodiment. The autonomous vehicle network integration system 200 comprises a primary vehicle 202; a driver 204; a mobile device 206; an autonomous vehicle network 208; a secondary vehicle(s) 210; an autonomous vehicle network integration data management center 212; a third-party databases 214; an autonomous vehicle network integration apparatus 300; and an on-board diagnostics system 500.

A driver 204 may enter their primary vehicle 202 carrying a mobile device 206, which may trigger the beginning of routine 100. The autonomous vehicle network integration apparatus 300 located in the primary vehicle 202 may communicate with the mobile device 206 to begin collecting information. The autonomous vehicle network integration application may be configured with a default driver 204, and that driver's driver profile 232 may be stored in memory on the mobile device or within the autonomous vehicle network integration apparatus 300. Alternately, the autonomous vehicle network integration application may include a selection menu that allows the driver 204 to self-identify through the autonomous vehicle network integration application user interface 400 (see FIG. 4 for an example user interface). The driver profile 232 may also be stored in a database available through wireless communication, and the autonomous vehicle network integration apparatus 300 may be configured to access the driver profile from an autonomous vehicle network integration data management center 212.

The driver profile 232 may be used to calculate the base influence range. For example, an experienced driver with a clean accident record may result in a smaller base influence range, as their responses may be assumed to be quick and practiced, allowing them to avoid hazards more rapidly, easily, and reliably. A beginning driver, on the other hand, may result in a larger base influence range, so that they receive notifications with more time to respond, and more distant vehicles may receive transmissions, allowing other semi-autonomous or fully autonomous vehicles to maintain a larger buffer of distance from the primary vehicle.

In other embodiments, the driver profile 232 may include a priority metric 236. This priority metric 236 may be based on economic, civic, or safety factors, and may give the associated driver priority over autonomous vehicles and/or traffic control devices. The result may be similar to the way in which emergency vehicle drivers may interact with traffic lights such that the emergency vehicle may be given a green light as it approaches an intersection. However, through the current disclosure, this influence may be automatically signaled over a wireless network, without need for a separate device requiring manual activation.

Some or all of the information in the driver profile 232 may, in some embodiments, be drawing from one or more third-party databases 214. Such databases might include state transportation registry databases, national registries, private insurance databases, the Internal Revenue Service information repository, or other public or private sources of information.

In some embodiments, the autonomous vehicle network integration apparatus 300 may be configured to detect vehicle startup without a recognized mobile device 206, and in such a case, send an alert to a registered mobile device 206. The autonomous vehicle network integration apparatus 300 may be configured to audibly alert the driver 204 within the primary vehicle 202 that a registered mobile device 206 has not been detected.

In some embodiments, the autonomous vehicle network integration apparatus 300 may generate updates to the driver profile 232 based on driver actions 224 detected through on-board diagnostic data 216 (OBD data) collected from the on-board diagnostics system 500. OBD data, gathered as described in further detail with respect to FIG. 5, may include acceleration, deceleration, turns, lane excursions, braking, and signaling. Turns executed without a threshold level of deceleration or without signaling may, for example, be logged as hazardous driving. A velocity maintained in excess of a speed limit detected as part of route data may similarly be logged as hazardous driving. A log may be maintained of all driver actions 224, and some threshold percentage of actions detected as hazardous driving may be used to adjust the driver profile such that a larger base influence range results.

Similar to the driver profile 232, the autonomous vehicle network integration apparatus 300 may be configured to load a vehicle profile 234 for the primary vehicle 202, wherein the vehicle profile 234 comprises at least one of mass 238, engine power 240, acceleration capability 242, deceleration capability 244, turning radius 246, vehicle sensors available 248, an automation level 250, and other physical and performance parameters 252. The vehicle profile 234 may be stored in memory on the mobile device 206 or on the autonomous vehicle network integration apparatus 300, or may be available through a connection to the autonomous vehicle network integration data management center 212.

Vehicle profile 234 information may be used to reduce or expand the base influence range based on vehicle performance, handling, and reliability. Vehicle mass 238 may be used in calculating an influence vector 218, such that the magnitude of the influence vector 218 for a larger vehicle may be greater than that for a smaller vehicle, all other parameters being equal, as illustrated in FIG. 10. Vehicles with vehicle sensors available 248 such as back-up cameras and proximity sensors may be allocated a smaller base influence range, and information from these sensors may be used to provide a higher level of automation.

Destination/location/route information 226 may be collected through the interaction of an autonomous vehicle network integration application with a third-party navigation application, such as Google Maps™, Waze™, or Citymapper™. In some embodiments, the autonomous vehicle network integration application may be capable of accepting destination entry and of calculating a preferred route. Traffic conditions 228 along the route may be detected through Google Maps, Waze, or other traffic tracking applications. Changes in surrounding traffic conditions 228 may be used to increase or decrease the base influence range in order to prioritize safety, performance, or power consumption.

Third-party weather applications, such as Weather.com™, AccuWeather™, or Weather Bug™, may be used to detect rain, fog, or other environmental conditions 230 along the route that might pose a hazard as the primary vehicle 202 traverses the route. Alternately, environmental conditions 230 may be available through the autonomous vehicle network integration data management center 212 from third-party databases 214. Detection of hazardous weather and other environmental conditions 230 along the route may result in an expanded moving influence range or a larger influence vector. Other environmental conditions 230 may include elevation changes. For example, a steep downhill grade along a route may impact the influence vector.

As the primary vehicle 202 traverses a route, the autonomous vehicle network integration apparatus 300 may interact with secondary vehicle(s) 210 as they enter the primary vehicle's influence range. Secondary vehicle(s) 210 may be part of an autonomous vehicle network 208, and so may include a mechanism for wireless communication with each other and with the primary vehicle 202. When a secondary vehicle enters the base influence range or moving influence range of the primary vehicle 202, the primary vehicle 202 may transmit its influence vector 218, as indicated in routine 100. The secondary vehicle(s) 210 may use this influence vector to adjust their velocity, acceleration, or other behavior in order to interact with the primary vehicle 202 safely, and in a manner that has the least impact on autonomous vehicle performance.

The primary vehicle 202 may in turn receive a secondary influence vector 220 from autonomous secondary vehicle(s) 210 that enter its range of influence. The autonomous vehicle network integration apparatus 300 may use this secondary influence vector 220 to recalculate the base influence range and/or moving influence range. The autonomous vehicle network integration apparatus 300 may also use the secondary influence vector 220 to generate continuous guidance 222 for the driver 204. Continuous guidance 222 may be intended to instruct the driver 204 to avoid hazards (hazard avoidance guidance), such as secondary vehicle(s) 210 that are not slowing down as they approach and so may potentially collide with the primary vehicle 202. Continuous guidance 222 may alternately be route navigation guidance. Route navigation guidance may include instructions to the driver 204 to slow down or speed up in order to smoothly and quickly navigate around one or more secondary vehicle(s) 210, instructions to get out of the way of a high priority vehicle, or instructions to turn or otherwise adjust the route to avoid secondary vehicle(s) 210.

In an embodiment, route navigation guidance may include proactive routing instructions. These proactive routing instructions help to manage traffic as opposed to just reacting to current traffic patterns by giving high priority vehicles faster routes to their destinations than low priority vehicles. For example, the proactive routing instructions could route a low priority vehicle to a side street in order to open a main road for a high priority vehicle. A high priority vehicle is one that needs to arrive at its destination as quickly as possible, such as an emergency response vehicle or a vehicle driven by a surgeon on the way to the hospital. By contrast, a low priority vehicle is one that does not urgently need to reach its destination, such as one driven by an individual heading to the shopping mall or to a routine day at work. The primary vehicle 202 may be either a high priority vehicle or a low priority vehicle. Similarly, the one or more secondary vehicle(s) 210 may be either high priority or low priority.

Not all vehicles encountered by the primary vehicle 202 may necessarily be autonomous vehicles, semi-autonomous vehicles, or non-autonomous vehicles provided with the disclosed technology. Vehicles lacking wireless transceivers and automation technology cannot receive transmission from a primary vehicle 202 and may not be detectable by some embodiments. In other embodiments, for a primary vehicle 202 with adequate sensor data available from the on-board diagnostics system 500, the autonomous vehicle network integration apparatus 300 may calculate an estimated secondary influence vector based on motion of a secondary vehicle(s) 210 detected by the primary vehicle 202 sensors.

Figure 13:
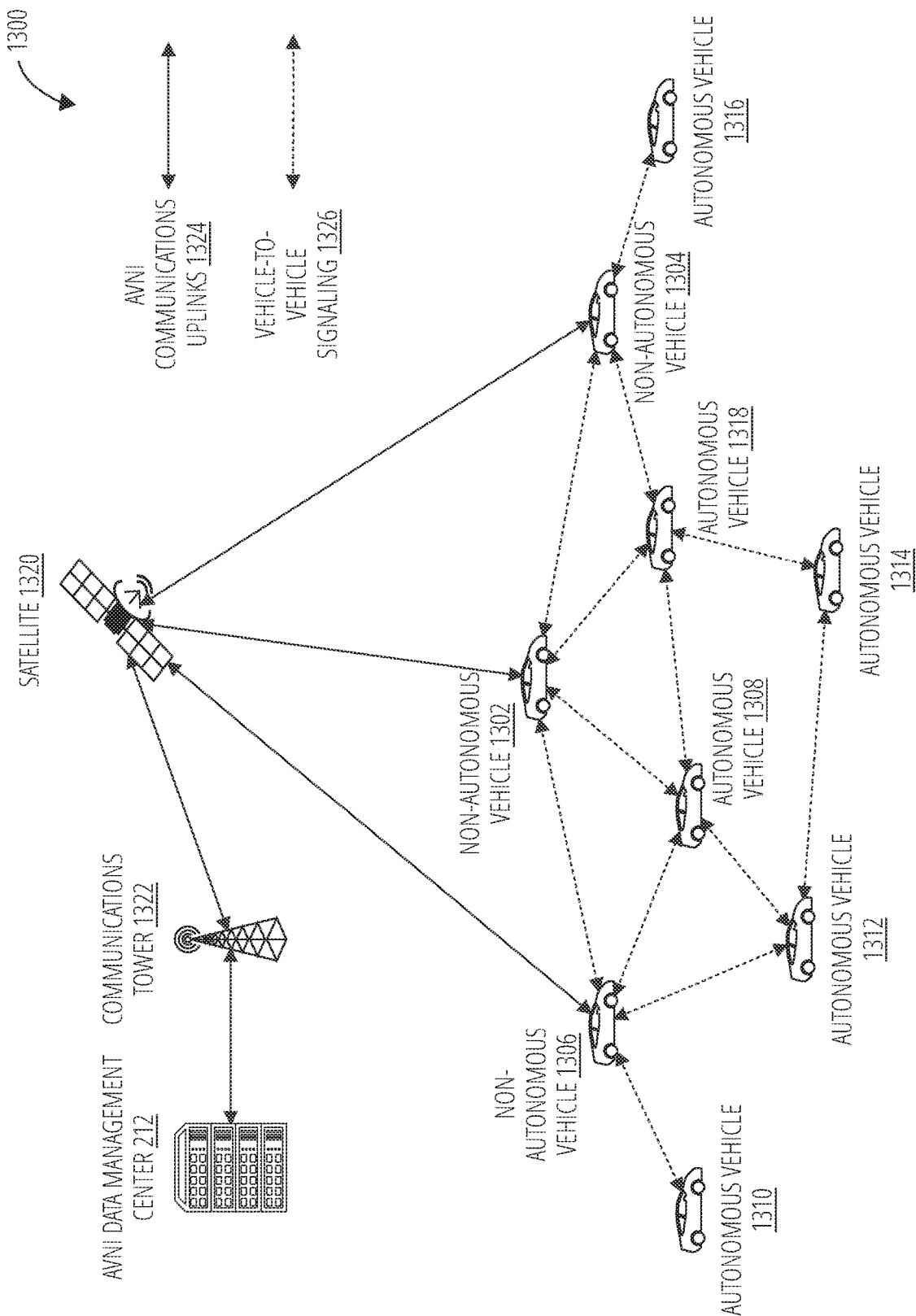
FIG. 13 illustrates a dedicated communication channel 1300 in accordance with one embodiment.
Figure 14:
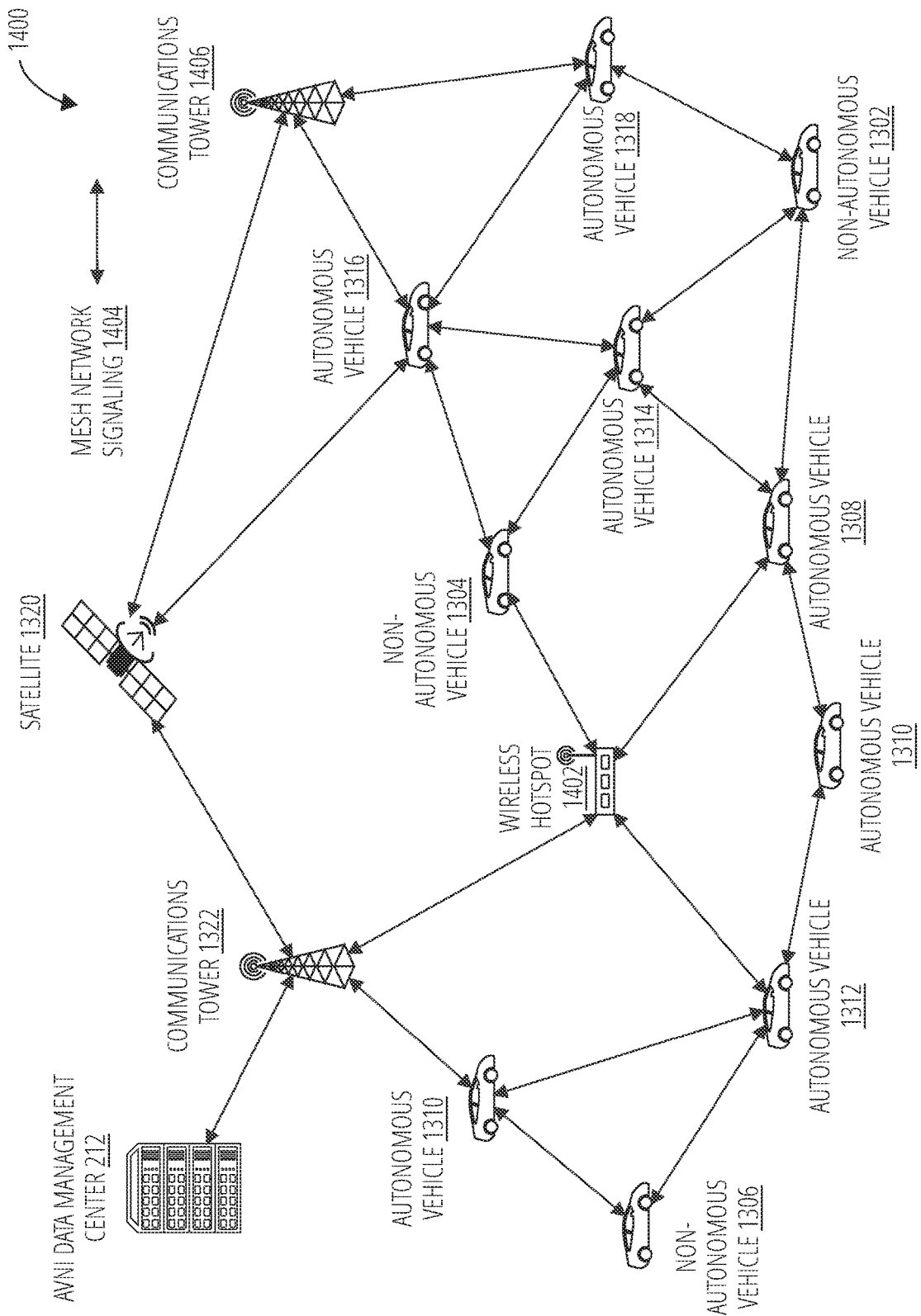
FIG. 14 illustrates a mesh network 1400 in accordance with one embodiment.

The data illustrated as moving between the autonomous vehicle network integration apparatus 300 and the mobile device 206 may alternately be gathered from and transmitted to an autonomous vehicle network integration data management center 212 over a wireless network. The autonomous vehicle network integration data management center 212 may be contacted using a wireless transceiver configured as part of the autonomous vehicle network integration apparatus 300, or using the wireless capabilities of the mobile device 206, as indicated by the dotted lines. The autonomous vehicle network integration data management center 212 may in turn receive information from public, paid, and private third-party databases 214. In some embodiments, the autonomous vehicle network integration apparatus 300 may be configured to access the third-party databases 214 directly. The autonomous vehicle network integration apparatus 300 may communicate with the autonomous vehicle network integration data management center 212 or other entities using a dedicated communication channel, as illustrated in FIG. 13, or over a mesh network 1400 as illustrated in FIG. 14.

FIG. 3 illustrates an autonomous vehicle network integration apparatus 300 in accordance with one embodiment. The autonomous vehicle network integration apparatus 300 comprises a wireless transceiver 302, an on-board diagnostics connection port 304, a memory 310, a central processing unit 312, and a bus 322. In some embodiments, an on-board diagnostics wireless transceiver 306 may be incorporated. Some embodiments may also comprise a universal serial bus port 308.

In some embodiments, autonomous vehicle network integration apparatus 300 may include many more components than those shown in FIG. 3. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware. In various embodiments, autonomous vehicle network integration apparatus 300 may comprise one or more physical and/or logical devices that collectively provide the functionalities described herein. In some embodiments, autonomous vehicle network integration apparatus 300 may comprise one or more replicated and/or distributed physical or logical devices.

The wireless transceiver 302 may provide an interface to communication networks and devices external to the autonomous vehicle network integration apparatus 300. The wireless transceiver 302 may serve as an interface for receiving data from and transmitting data to other systems. Embodiments of the wireless transceiver 302 Bluetooth or WiFi, a near field communication wireless interface, a cellular interface, and the like. The wireless transceiver 302 may be coupled to a wireless communication network via an antenna, either external to or integrated into the printed circuit board comprising the wireless transceiver 302. The wireless transceiver 302 may be used to communicate with a mobile device within the primary vehicle, secondary vehicles encountered during driving, an autonomous vehicle network integration data management center, and other wireless entities within range.

The on-board diagnostics connection port 304 use a wired connection to the primary vehicle's OBD connector, normally located beneath the steering wheel. In these embodiments, the autonomous vehicle network integration apparatus 300 may also be mounted beneath the steering console of the primary vehicle, or it may be mounted elsewhere in the primary vehicle with a cable running to the steering console area. The cable may be a 16 pin pass through cable or another OBD compatible hard-wired cable. In some embodiments, the autonomous vehicle network integration apparatus 300 may include at least one universal serial bus port 308. A wired OBD connection may be made using an OBD to USB cable. Other ports may be included to allow alternate OBD connections. In some embodiments, a wireless dongle may be connected to the primary vehicle's OBD connector. This dongle may provide wireless communication between the autonomous vehicle network integration apparatus 300 and the on-board diagnostics system 500. The dongle may include an on-board diagnostics wireless transceiver 306 that communicates with the wireless transceiver 302.

At least one universal serial bus port 308 may be included in some embodiments. The universal serial bus port 308 may be used to connect to the on-board diagnostics system 500 as already described. Alternately, the universal serial bus port 308 may provide charging and data transfer capabilities to one or more mobile devices within the primary vehicle.

Memory 310 generally comprises a random access memory ("RAM") and permanent non-transitory mass storage device, such as a hard disk drive or solid-state drive. The memory 310 may store instructions configured to implement a basic operating system 314 for the autonomous vehicle network integration apparatus 300. The memory 310 may also comprise application instructions 316 which configure the autonomous vehicle network integration apparatus 300 to implement the method disclosed herein. In some embodiments the memory 310 may be used to store the vehicle profile 318 and one or more driver profiles 320.

The central processing unit 312 may be configured to implement logic comprising an on-board diagnostic data analyzer 324, a route analyzer 326, an influence vector calculator 328, a range calculator 330, a secondary influence vector analyzer 332, and a continuous guidance generator

334. The on-board diagnostic data analyzer 324 may receive OBD data from the on-board diagnostics connection port 304. The on-board diagnostic data analyzer 324 may identify the OBD data needed to calculate the influence vector, base influence range, and moving influence range. These parameters may be sent to the 328 and the range calculator 330.

The route analyzer 326 may receive destination/location/route information 226, traffic conditions 228, and environmental conditions 230 via the wireless transceiver 302. It may then identify the features of this data that affect the influence vector and base influence range. These parameters may be sent to the influence vector calculator 328 and the range calculator 330.

The influence vector calculator 328 may dynamically calculate an influence vector throughout primary vehicle operation. The influence vector may be updated based on changes in velocity, acceleration, deceleration, engine power, fuel levels, and similar parameters, as indicated by OBD data analyzed by the on-board diagnostic data analyzer 324. The influence vector may also be updated based on changing route and environmental conditions, as indicated by the route analyzer 326. The influence vector calculator 328 provides the influence vector to the range calculator 330 in order to calculate moving ranges.

The range calculator 330 may calculate a base influence range based on vehicle profile 318 and driver profiles 320 received from the memory 310 or via the wireless transceiver 302. In some embodiments, the range calculator 330 may be configured to also calculate a base awareness range and/or a base hazard range, as described in further detail with regard to FIG. 7. The range calculator 330 further accepts as input the influence vector calculated by the influence vector calculator 328. The influence vector is used generate a moving influence range which may take into account the base influence range, and may modify it based on the magnitude of the influence vector. The moving influence range may be used to determine which secondary vehicles will influence and be influenced by the primary vehicle as the primary vehicle navigates the route, as illustrated in FIG. 6. In some embodiments, a base hazard range and/or a base awareness range may be modified with the influence vector to create a moving hazard range and/or a moving awareness range.

The bus 322 provides an internal means of connection for the separate electrical components comprised in the autonomous vehicle network integration apparatus 300. This may be a universal serial bus, a PCI or PCIe bus, or another bus technology configured to carry signals between these components.

Figure 4:
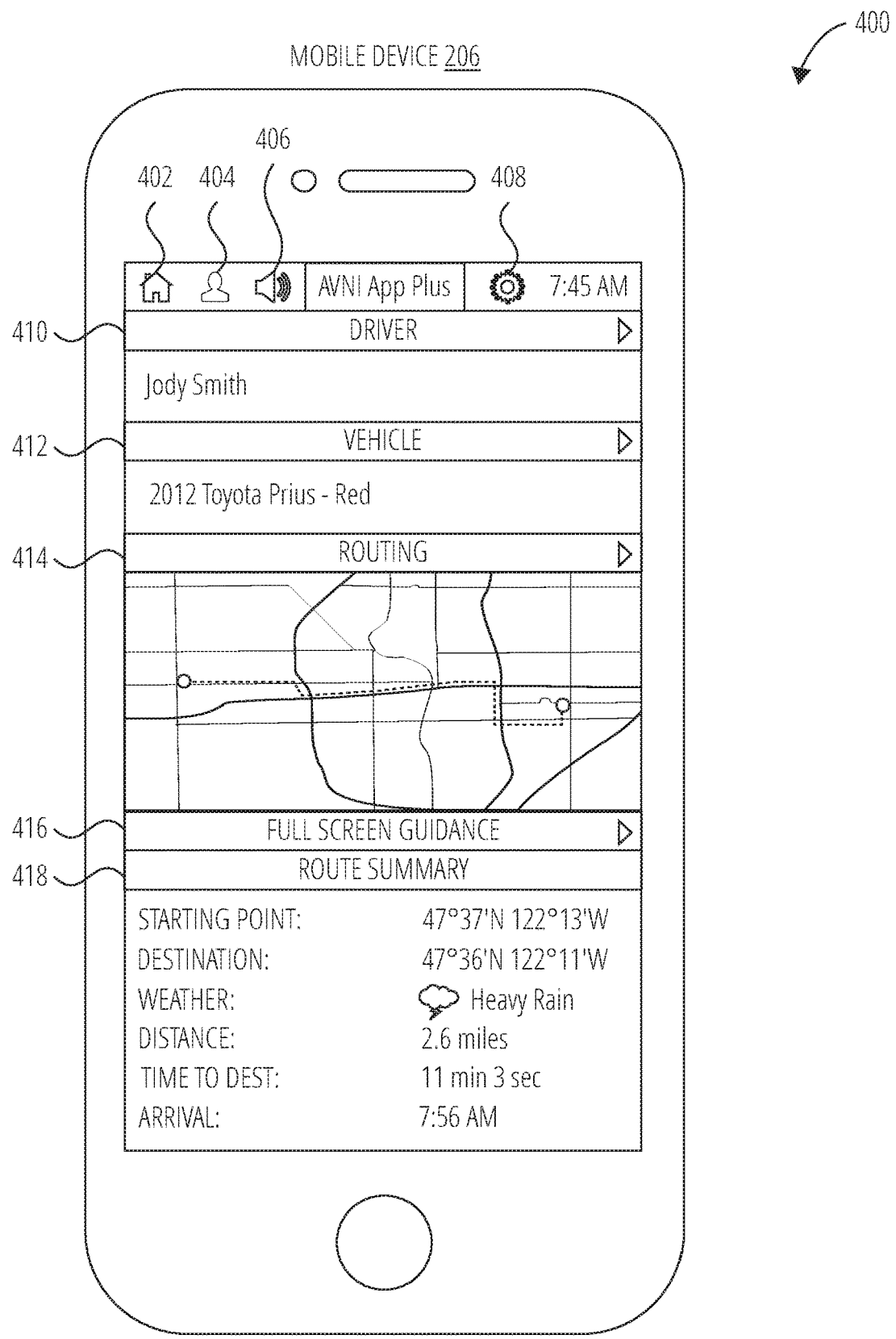
FIG. 4 illustrates an autonomous vehicle network integration application user interface 400 in accordance with one embodiment.

FIG. 4 illustrates an autonomous vehicle network integration application user interface 400 in accordance with one embodiment. The autonomous vehicle network integration application user interface 400 may be displayed on a mobile device 206 and may comprise a home icon 402, a profile icon 404, an audibles icon 406, a settings icon 408, a driver profile selection 410, a vehicle profile selection 412, a routing menu 414, an enter full screen guidance mode 416, and a route summary 418. The mobile device 206 may be a cell phone, a tablet computer, a GPS navigation device, an interface to a smart glass windshield display, or some other technology able to provide an interactive user experience.

The home icon 402, profile icon 404, audibles icon 406, and settings icon 408 may provide quick access to various screens configured into the autonomous vehicle network integration application. The home icon 402 may return the driver to a home screen such as the one illustrated. The profile icon 404 may take the driver to screen allowing them to select, view, or update their driver profile, or may allow the driver to select a custom configured set of screens associated with their driver profile. The audibles icon 406 may provide a short cut to a screen where audible alerts may be muted, volume-adjusted, and/or configured for different actions or hazards. The settings icon 408 may take the driver to a screen where all application settings may be viewed and modified.

The driver profile selection 410 and vehicle profile selection 412 selection bars may allow a driver to view and select from a preconfigured menu of stored driver and vehicle profiles. Alternately, the vehicle profile selection 412 may be programmed into and automatically detected from the autonomous vehicle network integration apparatus 300. The vehicle profile selection 412 may then allow the driver to view details that comprise the vehicle profile.

The routing menu 414 may allow the driver to set a destination and calculate a route. It may present a set of options to be selected by the driver that may control how the route is determined and what continuous guidance is required or preferred. The enter full screen guidance mode 416 bar may take the user to a screen in which continuous guidance is provided visually, by means of at least one of icons, brief statements, and various color palettes (e.g., green for go faster or route clear and red for hazard detected). The route summary 418 may provide an overview of information on the expected trip, as shown, including distance, weather, and estimated arrival.

Figure 5:
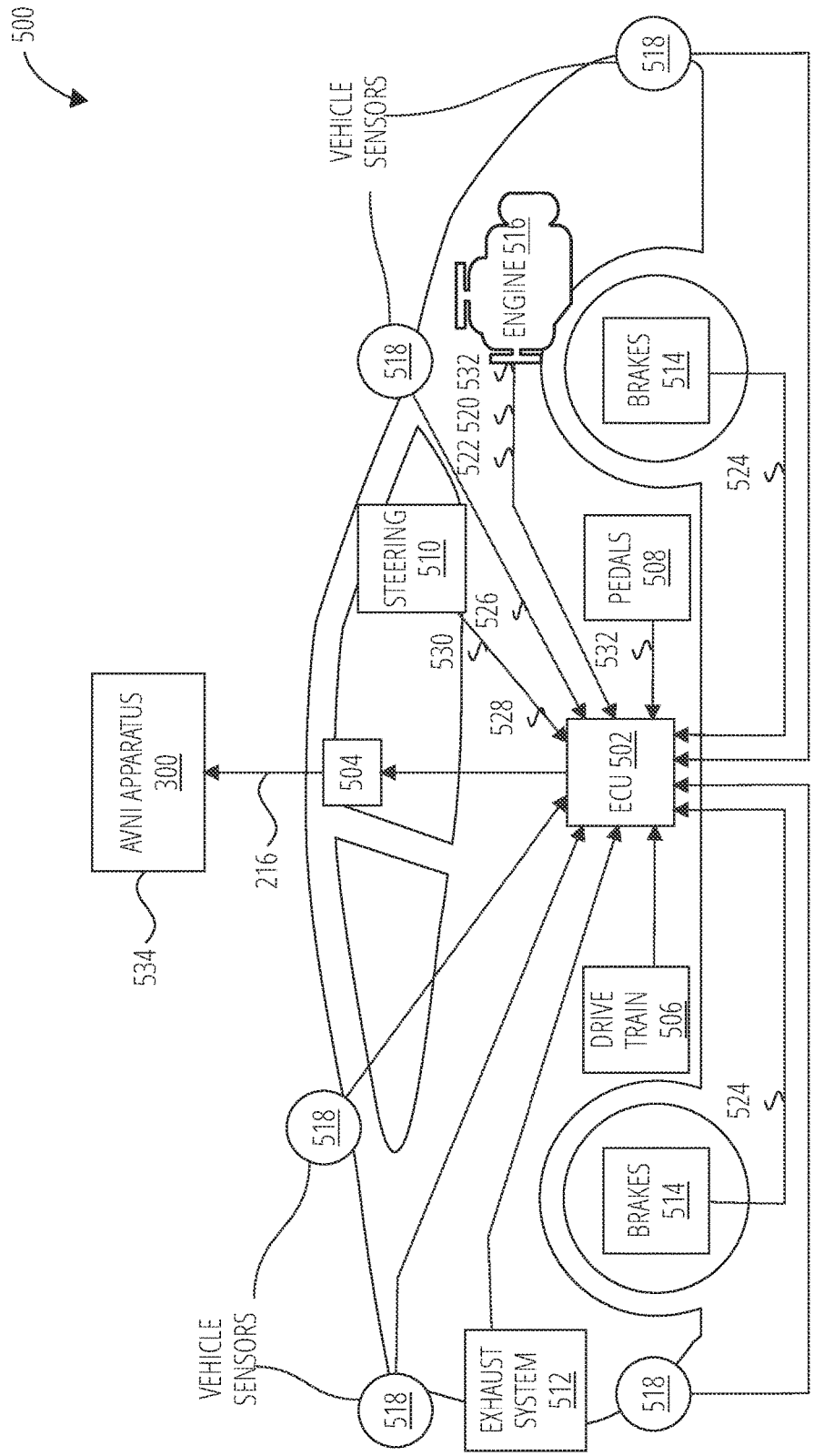
FIG. 5 illustrates an on-board diagnostics system 500 in accordance with one embodiment.

FIG. 5 illustrates a basic on-board diagnostics system 500 in accordance with one embodiment. The on-board diagnostics system 500 comprises an electronic controller unit 502 (ECU) that collects and manages diagnostic signals from a number of vehicle systems, and an OBD connector 504 that may be used to connect the autonomous vehicle network integration apparatus 300 to the on-board diagnostics system 500. These vehicle systems may include the drive train 506, the pedals 508, the steering 510, the exhaust system 512, the brakes 514, the engine 516, and the vehicle sensors 518.

The engine 516 may provide engine power 520 and deceleration 522 information. The brakes 514 may provide braking 524 data. The vehicle sensors 518 may provide signaling 526 information, and in some cases environmental conditions and secondary vehicles. The steering 510 may provide information on turn 528 and lane excursion 530 events. The pedals 508, as well as the engine 516, may provide information on acceleration 532. This data may be obtained from a number of systems in a standard road transport vehicle. This description is provided as one embodiment that may be used to implement the disclosed solution.

On-board diagnostic data 216 sent to the autonomous vehicle network integration apparatus 300 may be used for hazardous driving detection 534. Velocity in excess of a speed limit along the route, as indicated by databases or routing applications, may be one of the driver actions detected and logged. Sharp braking 524 may be detected. A sharp turn 528 or erratic motion of the steering 510 wheel may be logged, along with turning without signaling 526. Lane excursion 530 may be detected through analysis of several data sources, including location information and steering 510 and signaling 526 data. These and other indicators may be defined as hazardous driving, and a driver profile may in some embodiments be updated to indicate that greater precautions may be necessary for the indicated driver.

FIG. 6 illustrates influence vector and ranges 600 in accordance with one embodiment. A primary vehicle 202 equipped with an autonomous vehicle network integration apparatus 300 may have a base influence range 602 established based on its vehicle profile, the driver profile, and environmental conditions anticipated along a detected route. The base influence range 602 may be considered the smallest possible influence range, in effect regardless of the vehicle's motion along the route. For this reason, the base influence range 602 may in some embodiments effectively be a perimeter at a distance equidistant from all points along the surface of a vehicle. The illustrated embodiment depicts the base influence range 602 as an oval, but other configurations are possible.

The influence vector 604 may be calculated based on parameters relating to the physical configurations of the primary vehicle 202 and its motion. Acceleration, deceleration, and velocity may impact the influence vector 604. A example with regard to velocity is illustrated in FIG. 9. The mass of the primary vehicle 202 may also be used in calculating the influence vector, because the vehicle's mass, along with its velocity, will determine its momentum, based on the formula in Equation 1. A vehicle's momentum has a direct impact on its ability to brake to a complete stop from a particular velocity. An illustration of how mass may impact the influence vector is illustrated in FIG. 10.

$$\text{momentum}=\text{mass}\times\text{velocity} \qquad \text{Equation 1}$$

The moving influence range 606 may be generated based on the base influence range 602 and the influence vector 604. As illustrated, the moving influence range 606 may extend into the direction the primary vehicle 202 is moving, but may not extend as far in the opposite direction. This configuration allows the primary vehicle 202 to influence secondary vehicle(s) 210 that lie near or within its anticipated field of motion. Thus, these vehicles are those most likely to pose a hazard or induce route adjustment. Once a secondary vehicle(s) 210 has been passed and lies outside the primary vehicle 202 anticipated field of motion, its influence and the hazard it might pose may drop off sharply, and thus it may be excluded from the moving influence range 606.

FIG. 7 illustrates base range levels 700 in accordance with one embodiment. In some configurations, it may be useful for a primary vehicle 202 to detect or contact secondary vehicle(s) 210 that are nearby, but outside of its range of influence. For this reason, a base awareness range 702 may be established. The base awareness range 702 may typically lie outside of the base influence range 602. The base awareness range 702 may be calculated as proportional to the base influence range 602 (e.g., its radius may be 120% of the base influence range 602 radius in all directions, some other percentage, or some other shape). The base awareness range 702 may in some embodiments be defined as an absolute distance from the primary vehicle 202 (e.g., a fifty-yard perimeter).

In some configurations, it may be useful for a primary vehicle 202 to have a particular awareness of objects and events occurring at a distance such that immediate and significant response is necessary. For this reason, a base hazard range 704 may be established. The base hazard range 704 may typically lie within the base influence range 602. The base hazard range 704 may be calculated as proportional to the base influence range 602 (e.g., its radius may be 40% of the base influence range 602 radius in all directions, some other percentage, or some other shape). The base hazard range 704 may in some embodiments be defined as an absolute distance from the primary vehicle 202 (e.g., a five-yard perimeter).

FIG. 8 illustrates moving range levels 800 in accordance with one embodiment. The influence vector may be used to calculate a moving awareness range 802 and moving hazard range 804 in the same manner as it may be used to calculate the moving influence range 606. This calculation may result in a moving awareness range 802 and moving hazard range 804 extending substantially more in the primary vehicle 202 direction of motion than in the opposite direction in order to give priority to awareness and prevention of potential hazards in front of the primary vehicle 202.

In some embodiments, the moving awareness range 802 and/or moving hazard range 804 may be increased by the magnitude of the influence vector beyond the perimeters of the base awareness range and base hazard range, respectively, but may be more circular than oval, and may be more centered on the vehicle, in a manner that does not give priority to secondary vehicles or hazards in the direction of motion. Other configurations are possible in other embodiments, depending on the specific calculations performed.

FIG. 9 illustrates influence vector and range comparison by velocity 900 in accordance with one embodiment. The purpose of the influence vector and its use in calculating moving ranges is to provide the primary vehicle adequate influence upon and from secondary vehicles most likely to pose a hazard or obstacle, i.e., those that lie in the direction the primary vehicle is moving. The influence vector and moving ranges may also allow vehicles and obstacles that are less likely to affect the primary vehicle, i.e., those not in the primary vehicle's direction of motion, to have a very low influence upon and be significantly less influenced by the primary vehicle.

For this reason, the influence vector may need to be adjusted based on factors that increase the potential for hazard in the primary vehicle's direction of motion by impacting the primary vehicle's ability to slow or stop to avoid a hazard. One such factor is the velocity the primary vehicle is traveling at. A car travelling at 35 MPH 902 may be able to slow or stop much more easily and quickly than a car travelling at 65 MPH 904, assuming the two cars are similar in mass and other physical and performance parameters. In order to account for the increased difficulty in slowing or stopping, the influence vector for 1.5 tons at 65 MPH 908 may be significantly greater in magnitude than the influence vector for 1.5 tons at 35 MPH 906. As a result, the moving influence range for 1.5 tons at 65 MPH 912 may extend farther in front of the car travelling at 65 MPH 904 than the moving influence range for 1.5 tons at 35 MPH 910 does for the car travelling at 35 MPH 902.

As a result, the car travelling at 65 MPH 904 may detect secondary vehicles at a greater distance, and may thus be able to influence them and be influenced by them earlier than would otherwise be the case. This earlier influence may provide the primary vehicle driver more time to react to continuous guidance, and thus more time to slow or stop the primary vehicle to avoid or mitigate upcoming hazards.

FIG. 10 illustrates an influence vector and range comparison by mass 1000 in accordance with one embodiment. The purpose of the influence vector and its use in calculating moving ranges is to provide the primary vehicle adequate influence upon and from secondary vehicles most likely to pose a hazard or obstacle, i.e., those that lie in the direction the primary vehicle is moving. The influence vector and moving ranges may also allow vehicles and obstacles that are less likely to affect the primary vehicle, i.e., those not in the primary vehicle's direction of motion, to have a very low influence upon and be significantly less influenced by the primary vehicle.

For this reason, the influence vector may need to be adjusted based on factors that increase the potential for hazard in the primary vehicle's direction of motion by impacting the primary vehicle's ability to slow or stop to avoid a hazard. One such factor is the mass of the primary vehicle, or the weight of the primary vehicle, as being directly proportional to its mass. A car travelling at 45 MPH 1002 may be able to slow or stop much more easily and quickly than a semi travelling at 45 MPH 1004. In order to account for the increased difficulty in slowing or stopping, the influence vector for 40 tons at 45 MPH 1008 (a potential weight for a semi hauling a load) may be significantly greater in magnitude than the influence vector for 1.5 tons at 45 MPH 1006 (a potential weight for a 4 door passenger vehicle). As a result, the moving influence range for 40 tons at 45 MPH 1012 may extend farther in front of the semi travelling at 45 MPH 1004 than the moving influence range for 1.5 tons at 45 MPH 1010 does for the car travelling at 45 MPH 1002.

As a result, the semi travelling at 45 MPH 1004 may detect secondary vehicles at a greater distance, and may thus be able to influence them and be influenced by them earlier than would otherwise be the case. This earlier influence may provide the primary vehicle driver more time to react to continuous guidance, and thus more time to slow or stop the primary vehicle to avoid or mitigate upcoming hazards.

FIG. 11 illustrates routing related decisions 1100 in accordance with one embodiment. When determining a route 1102 to a selected destination 1104, the autonomous vehicle network integration apparatus may collect data about traffic control 1106, environmental conditions 1108, and traffic conditions 1110 along the route. This data may continue to be collected as the vehicle navigates to the destination, and continuous guidance, including route navigation guidance, may be provided throughout the trip.

In one embodiment, traffic control 1106 data may indicate a series of synchronized stoplights along the route 1102. Route navigation guidance 1112 may be provided as the primary vehicle approaches the first point of traffic control 1106, to indicate an adjustment of speed that would align the vehicle's arrival at each traffic light with the light's green cycle, allowing the primary vehicle to pass through all of the lights without stopping.

In one embodiment, environmental conditions 1108 may be detected once the route 1102 is calculated. For example, heavy rain, fog, ice, or other conditions that may affect the driver's ability to recognize hazards and the primary vehicle's ability to slow and stop to avoid them, might be indicated. This data may by used to effect a moving influence range increase due to weather hazards 1116. Secondary vehicles may be detected earlier due to the expanded moving influence range, thus allowing the driver more time to adjust to their influence safely.

In one embodiment, traffic conditions 1110 may require a route change due to road closure 1118 while the primary vehicle is en route. Route navigation guidance 1114 may be provided to notify the driver of a change in route 1102 and a new estimated arrival time.

FIG. 12 illustrates hazard and secondary influence decisions 1200 in accordance with one embodiment. As a primary vehicle 202 navigates a route, a number of entities may fall within the moving influence range 1202 of the primary vehicle 202. The solution disclosed herein may provide hazard avoidance guidance 1210 and/or secondary influence guidance 1212 to the driver based on these entities.

In one embodiment, a traffic condition database may provide the autonomous vehicle network integration apparatus data about road hazards in the form at least one obstacle 1204 in the road a primary vehicle 202 needs to traverse. Alternately, available vehicle sensors may provide OBD data that would alert the driver to the presence of an obstacle 1204 ahead. In either case, hazard avoidance guidance 1210 may be provided to warn the driver of the obstacle 1204 ahead.

In one embodiment, a traffic control database may provide the autonomous vehicle network integration apparatus data about traffic control 1206 entities, such as stoplights or, as illustrated, yield signs. As the primary vehicle 202 approaches a portion of the route controlled by a traffic control 1206 entity, detecting a secondary vehicle(s) 210 within the moving influence range 1202, having a secondary influence vector 1208 within the moving influence range 1202, may trigger secondary influence guidance 1212. For example, the primary vehicle 202 may have a yield sign while the secondary vehicle(s) 210 does not. In such a case, the secondary influence guidance 1212 may notify the driver of a need to slow down and yield to the approaching secondary vehicle(s) 210.

FIG. 13 illustrates a dedicated communication channel 1300 in accordance with one embodiment. In one embodiment, a non-autonomous vehicle 1302, a non-autonomous vehicle 1304, and a non-autonomous vehicle 1306, all configured to implement the disclosed solution, may each communicate with an autonomous vehicle network integration data management center 212 over a dedicated communication channel. These autonomous vehicle network integration communications uplink 1324 may occur directly with a dedicated AVNI network, and be completely independent of and private from vehicle-to-vehicle signaling 1326.

The autonomous vehicle network integration communications uplink 1324 signals may be transmitted by non-autonomous vehicle 1302 to a satellite 1320 overhead. The satellite 1320 may belong to a network of satellites used by cellular service providers, internet service providers, or other entities, such as low earth orbit satellites deployed by Amazon and Space X. The satellite 1320 receiving the autonomous vehicle network integration communications uplink 1324 may transmit the signal to an earthbound communications tower 1322, which may direct the transmission to the autonomous vehicle network integration data management center 212 over a wide area network, a local area network, the Internet, or some other connection method. The autonomous vehicle network integration data management center 212 may in turn transmit data to a communications tower 1322 or satellite 1320, to be relayed to and received by the non-autonomous vehicle 1302.

Non-autonomous vehicle 1302, non-autonomous vehicle 1304, and non-autonomous vehicle 1306 may interact with the network of autonomous vehicles they encounter, such as the illustrated autonomous vehicle 1308, autonomous vehicle 1310, autonomous vehicle 1312, autonomous vehicle 1314, autonomous vehicle 1316, and autonomous vehicle 1318. Vehicle-to-vehicle signaling 1326 may be transmitted by each vehicle to the other vehicles within its wireless range. In this embodiment, however, the transmission of a particular vehicle, such as non-autonomous vehicle 1302 may be received by another within range, such as autonomous vehicle 1318, but that transmission may not be relayed to other vehicles within the range of autonomous vehicle 1318, such as autonomous vehicle 1314.

FIG. 14 illustrates a mesh network 1400 in accordance with on embodiment. In contrast with the network configuration illustrated in FIG. 13, communication between non-autonomous vehicles as disclosed herein with the autonomous vehicle network integration data management center 212 may be transmitted to any wireless transceiver within range, and from thence be relayed across multiple transceivers or "nodes" as a means of communicating between the source and recipient of a signal transmission.

In one embodiment, non-autonomous vehicle 1302 may not be able to detect and synchronize with satellite 1320. Rather than needing to connect directly to a dedicated AVNI communication channel, in a mesh network signaling 1404 configuration, non-autonomous vehicle 1302 may be able to make use of autonomous vehicle 1318 to relay the wireless transmission to communications tower 1406, which may then transmit the signal to satellite 1320, may send the signal over a wired (e.g. copper cable or fiber optic) network, or may otherwise route the signal to the autonomous vehicle network integration data management center 212.

Similarly, a transmission from non-autonomous vehicle 1304 may be relayed by wireless hotspot 1402 to communications tower 1322 and thus to the autonomous vehicle network integration data management center 212. Non-autonomous vehicle 1306 may reach autonomous vehicle network integration data management center 212 through a relayed transmission from autonomous vehicle 1310.

Relayed signaling across a mesh network may be managed by logic incorporated within each wireless transceiver in the mesh network. Wireless transceiver(s) within an autonomous vehicle network integration apparatus may be configured to integrate with public wireless hotspots, cellular and wireless towers, similarly equipped vehicles, etc. In one embodiment, algorithms may limit the number of nodes a signal may travel across. In one embodiment, certain nodes such as communications towers for the driver's cellular provider, or AVNI-equipped vehicles, may be preferred.

Terms used herein should be accorded their ordinary meaning in the relevant arts, or the meaning indicated by their use in context, but if an express definition is provided, that meaning controls.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Software" in this context refers to logic implemented as processor-executable instructions in a machine memory (e.g. read/write volatile or nonvolatile memory or media).

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

I claim:

1. A method for integrating a non-autonomous vehicle into an autonomous vehicle network, comprising:
    activating an autonomous vehicle network integration application on a mobile device detected within a primary vehicle;

detecting a destination from the mobile device;
detecting a route to the destination from the mobile device;
determining a vehicle profile and a driver profile;
determining a base influence range surrounding a perimeter of the primary vehicle based on the vehicle profile and the driver profile;
dynamically updating the base influence range during operation of the primary vehicle along the route, using environmental conditions detected in real-time by vehicle sensors on the primary vehicle, and continuously-monitored traffic conditions using the mobile device;
continuously monitoring on-board diagnostic data during operation of the primary vehicle, wherein the on-board diagnostic data includes location, velocity, and direction of movement of the primary vehicle;
generating an influence vector originating from the primary vehicle towards the direction of movement, wherein the length of the influence vector is based on a current velocity of the primary vehicle;
generating a moving influence range surrounding the base influence range and defined by the length of the influence vector;
dynamically updating the moving influence range based on dynamic changes of the base influence range and the influence vector during the primary vehicle's operation along the route;
detecting at least one secondary vehicle within at least one of the base influence range and the moving influence range;
transmitting the influence vector to the secondary vehicle;
receiving a secondary influence vector from the secondary vehicle, wherein the secondary influence vector is indicative of a motion of the secondary vehicle;
dynamically updating the moving influence range based on the secondary influence vector; and
providing continuous guidance to a driver through the mobile device, wherein the continuous guidance comprises route navigation guidance and hazard avoidance guidance.

2. The method of claim 1,
wherein determining the driver profile further comprises:
detecting the driver within the primary vehicle; and
loading a driver profile for the driver detected.

3. The method of claim 2, wherein the driver is detected by selecting the driver from the autonomous vehicle network integration application.

4. The method of claim 2, wherein the driver is detected by detecting the mobile device associated with the driver.

5. The method of claim 2, further comprising:
logging driver actions, wherein the driver actions include acceleration, deceleration, turns, lane excursions, braking, and signaling; detecting when the driver actions indicate hazardous driving; and
updating the driver profile when the driver actions indicating the hazardous driving are detected.

6. The method of claim 2, wherein the driver profile includes a priority metric.

7. The method of claim 1
wherein determining the vehicle profile comprises:
loading a vehicle profile for the primary vehicle, wherein the vehicle profile comprises at least one of mass, engine power, acceleration capability, deceleration capability, turning radius, the vehicle sensors available, an automation level, and other physical and performance parameters; and
generating the influence vector further comprises:
modifying the influence vector based on the vehicle profile.

8. The method of claim 1, further comprising:
calculating a base awareness range, wherein the base awareness range extends beyond the base influence range;
dynamically calculating a moving awareness range based on the base awareness range and the influence vector;
detecting the secondary vehicle within the moving awareness range; and
transmitting the influence vector to the secondary vehicle within the moving awareness range.

9. The method of claim 1, further comprising:
calculating a base hazard range, wherein the base hazard range lies within the base influence range;
dynamically calculating a moving hazard range based on the base hazard range and the influence vector; and
providing the hazard avoidance guidance when obstacles are detected within the moving hazard range.

10. The method of claim 1, further comprising calculating the secondary influence vector based on input from the vehicle sensors on condition that the secondary influence vector is not received from the secondary vehicle.

11. An autonomous vehicle network integration apparatus, the autonomous vehicle network integration apparatus comprising:
an on-board diagnostics connection port;
a wireless transceiver;
a processor; and
a memory storing instructions that, when executed by the processor, configure the apparatus to:
activate an autonomous vehicle network integration application on a mobile device detected within a primary vehicle;
detect a destination from the mobile device;
detect a route to the destination from the mobile device;
determine a vehicle profile and a driver profile;
determine a base influence range surrounding a perimeter of the primary vehicle based on the vehicle profile and the driver profile;
dynamically update the base influence range during operation of the primary vehicle along the route, using environmental conditions detected in real-time by vehicle sensors on the primary vehicle, and continuously-monitored traffic conditions using the mobile device;
continuously monitor on-board diagnostic data during operation of the primary vehicle, wherein the on-board diagnostic data includes location, velocity, and direction of movement of the primary vehicle;
generate an influence vector originating from the primary vehicle towards the direction of movement, wherein the length of the influence vector is based on a current velocity of the primary vehicle;
generate a moving influence range surrounding the base influence range and defined by the length of the influence vector;
dynamically update the moving influence range based on dynamic changes of the base influence range and the influence vector during the primary vehicle's operation along the route;
detect at least one secondary vehicle within the moving influence range;
transmit the influence vector to the secondary vehicle within the moving influence range;

receive a secondary influence vector from the secondary vehicle, wherein the secondary influence vector is indicative of a motion of the secondary vehicle;

dynamically update the moving influence range based on the secondary influence vector; and provide continuous guidance to a driver, wherein the continuous guidance comprises route navigation guidance and hazard avoidance guidance.

12. The autonomous vehicle network integration apparatus of claim 11, wherein the on-board diagnostics connection port comprises a wired connection to an on-board diagnostics system of the primary vehicle.

13. The autonomous vehicle network integration apparatus of claim 11, wherein the on-board diagnostics connection port comprises an on-board diagnostics wireless transceiver physically connected to an on-board diagnostics system of the primary vehicle in communication with the wireless transceiver of the autonomous vehicle network integration apparatus.

14. The autonomous vehicle network integration apparatus of claim 11, further comprising a universal serial bus port.

15. An autonomous vehicle network integration system, the autonomous vehicle network integration system comprising:
a primary vehicle, wherein the primary vehicle is not an autonomous vehicle and the primary vehicle includes an on-board diagnostics system;
a mobile device, wherein the mobile device is configured with an autonomous vehicle network integration application; and
an autonomous vehicle network integration apparatus, wherein the autonomous vehicle network integration apparatus is configured to:
activate the autonomous vehicle network integration application on the mobile device detected within the primary vehicle;
detect a destination from the mobile device;
detect a route to the destination from the mobile device;
determine a vehicle profile and a driver profile;
determine a base influence range surrounding a perimeter of the primary vehicle based on the vehicle profile and the driver profile;
dynamically update the base influence range during operation of the primary vehicle along the route, using environmental conditions detected in real-time by vehicle sensors on the primary vehicle, and continuously-monitored traffic conditions using the mobile device;
continuously monitor on-board diagnostic data during operation of the primary vehicle, wherein the on-board diagnostic data includes location, velocity, and direction of movement of the primary vehicle;
generate an influence vector originating from the primary vehicle towards the direction of movement, wherein the length of the influence vector is based on a current velocity of the primary vehicle;
generate a moving influence range surrounding the base influence range and defined by the length of the influence vector;
dynamically update the moving influence range based on dynamic changes of the base influence range and the influence vector during the primary vehicle's operation along the route;
detect at least one secondary vehicle within the moving influence range;
transmit the influence vector to the secondary vehicle within the moving influence range;
receive a secondary influence vector from the secondary vehicle, wherein the secondary influence vector is indicative of a motion of the secondary vehicle;
dynamically update the moving influence range based on the secondary influence vector; and
provide continuous guidance to a driver, wherein the continuous guidance comprises route navigation guidance and hazard avoidance guidance.

16. The autonomous vehicle network integration system of claim 15, wherein the primary vehicle is a low priority vehicle, the secondary vehicle is a high priority vehicle, and the route navigation guidance comprises proactive routing instructions configured to guide the low priority vehicle to the destination using the route that minimizes interference with the high priority vehicle.

17. The autonomous vehicle network integration system of claim 15, the autonomous vehicle network integration apparatus further configured to:
detect the driver within the primary vehicle; and
load a driver profile for the driver detected in order to determine the driver profile; and
load a vehicle profile for the primary vehicle in order to determine the vehicle profile, wherein the vehicle profile comprises at least one of mass, engine power, acceleration capability, deceleration capability, turning radius, the vehicle sensors available, an automation level, and other physical and performance parameters.

18. The autonomous vehicle network integration system of claim 16, further comprising an autonomous vehicle network integration data management center, wherein the autonomous vehicle network integration data management center stores at least one of the driver profile and the vehicle profile.

19. The autonomous vehicle network integration system of claim 18, wherein the autonomous vehicle network integration data management center interacts with third-party databases to collect data for inclusion in at least one of the driver profile and the vehicle profile.

20. The autonomous vehicle network integration system of claim 18, wherein the autonomous vehicle network integration apparatus communicates with the autonomous vehicle network integration data management center through a dedicated communication channel.

21. The autonomous vehicle network integration system of claim 18, wherein the autonomous vehicle network integration apparatus communicates with the autonomous vehicle network integration data management center through a mesh network, wherein the mesh network comprises at least one additional wireless transceiver detected within at least one of the base influence range and the moving influence range.

* * * * *